July 23, 1929.  J. D. CUMMINGS ET AL  1,721,546
TRACTOR ATTACHMENT
Filed Oct. 24, 1927   2 Sheets-Sheet 2
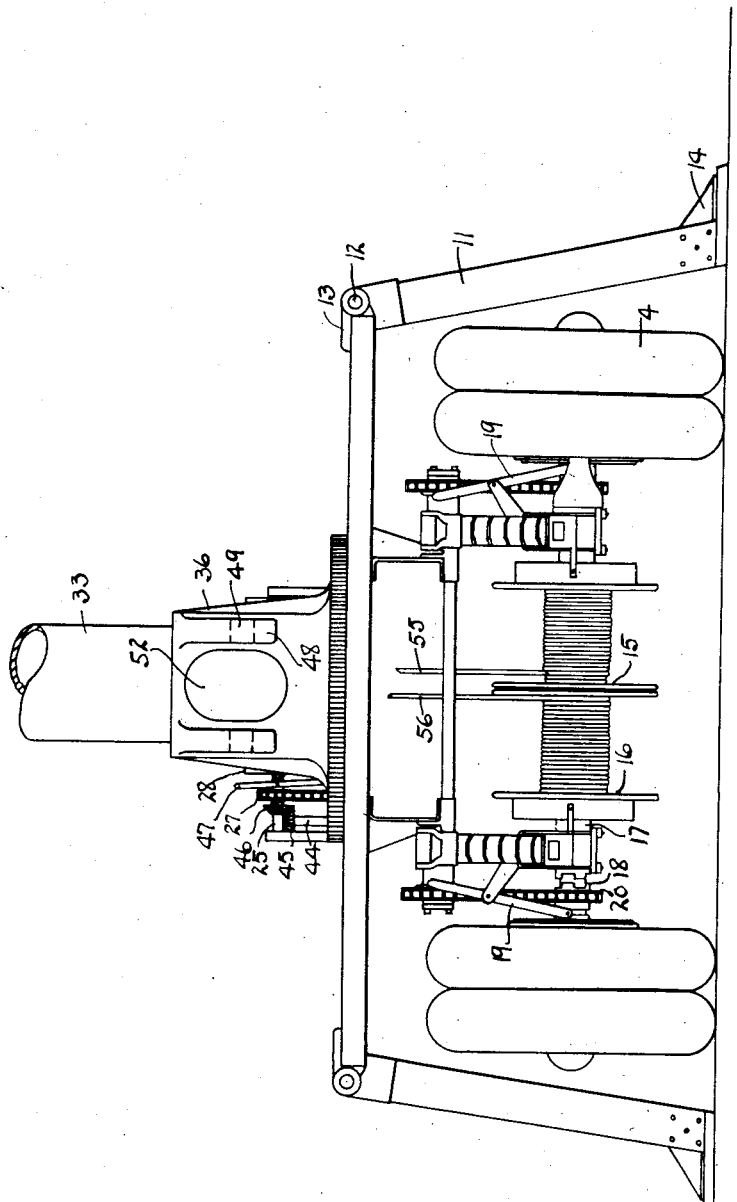

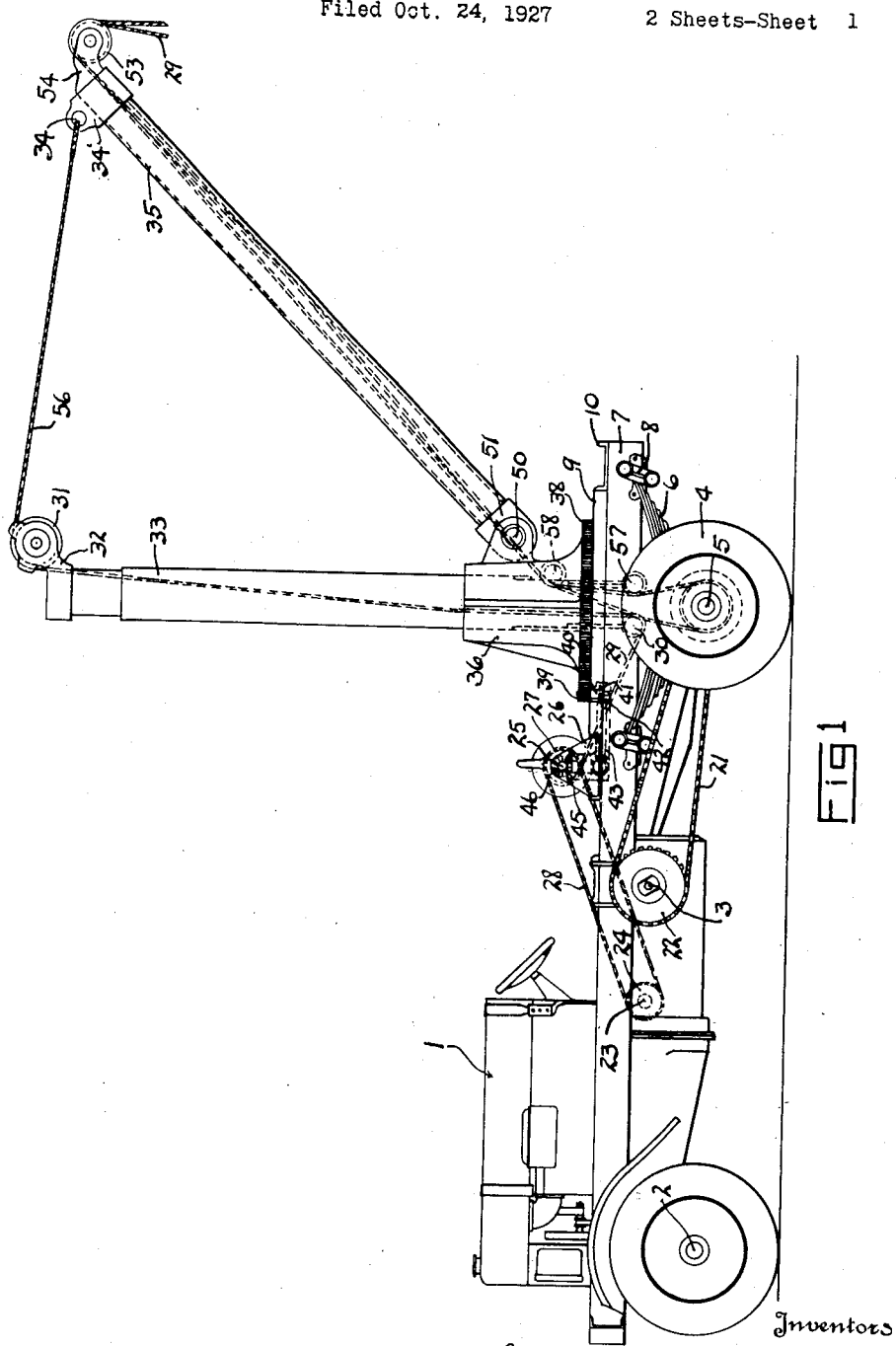

Patented July 23, 1929.

1,721,546

UNITED STATES PATENT OFFICE.

JAMES D. CUMMINGS AND ROBERT R. NORRIS, OF HOUSTON, TEXAS; SAID NORRIS ASSIGNOR TO W-K-M COMPANY, OF HOUSTON, TEXAS, A CORPORATION OF TEXAS.

TRACTOR ATTACHMENT.

Application filed October 24, 1927. Serial No. 228,306.

Our invention relates to an improvement in load operating attachments for tractors.

It is an object of the invention to provide a means for adapting a tractor of ordinary construction for the raising and handling of loads and for arranging for the most effective operation of the device from the tractor itself.

It is desired particularly to form a rotatable mast and boom thereon and hoisting means connected therewith, whereby loads such as a power operated shovel or bucket may be lifted and moved by the operating device, which is capable of most efficient and economical handling.

The invention resides in the particular construction and arrangement of the parts making up the attachment, and a convenient means for operating the same from the operative parts of a tractor of ordinary construction.

Referring to the drawing herewith wherein the invention is disclosed, Fig. 1 is a side elevation of a tractor equipped with our invention. Fig. 2 is a rear end view of the tractor with our invention thereon, the mast and boom being broken away or removed for greater clearness.

Referring to Fig. 1 of the drawing, we have shown in side elevation a tractor of ordinary make, indicated at 1. Said tractor as constructed for use has a front axle 2 and a rear axle 3. The rear axle is the drive axle or power shaft and is now rotated in the usual manner to cause the traction wheels to drive the tractor. In our construction we have removed the rear wheels 4 from the axle 3 and have placed them upon an auxiliary axle, indicated at 5.

The axle 5 forms a support through the instrumentality of springs 6 for the rear end of a frame work 7. The springs are connected by shackles 8 to said frame work at each side thereof, the springs being supported upon the said shaft 5. The frame work 7 comprises two longitudinal side members, as indicated in Fig. 1, and these side members are connected by a plurality of transverse members to make up a frame work for the support of a platform 9. The rear ends of the side members 7 are connected by a channel iron 10 which extends laterally beyond the traction wheels 4, as shown in Fig. 2, and may have attached thereto, as shown, a pair of supporting legs 11. These legs may be hinged at 12 for connection to an attaching bracket 13. The lower ends of the legs are formed with feet 14 adapted to contact firmly with the ground or roadway on which the tractor is running. It will be noted that these legs may be swung upwardly on the hinge 12 to lie in the channel iron 10 when the legs are not in use.

The auxiliary rear axle 5 furnishes a support for hoisting reels 15 and 16. These reels are rotatable upon the axle and each of the reels is connected to a sleeve 17 which extends along the axle 15 and may be engaged by a clutch 18. The clutch 18 is adapted to be moved along the axle by means of a lever 19 supported upon the frame work of the tractor.

The clutch member 18 has thereon a sprocket wheel 20, which is operatively connected by means of a sprocket chain 21 with a sprocket wheel 22, mounted upon the rear axle 3 of the original tractor.

The tractor is provided with the usual power take off, including a shaft 23, which has thereon a drive sprocket 24. I have mounted upon the frame work 7 of the tractor a shaft 25 supported at its ends within brackets 26 on the frame work. This shaft has thereon a sprocket wheel 27 connected with the sprocket wheel 24 by a drive chain 28'. The sprocket wheel 27 is mounted loosely upon the shaft 25 and has a clutch at each side thereof adapted to engage the same in driving relation with the said shaft or with a reel 28 mounted on said shaft.

The reel 28 is rotatable on the shaft and has connected therewith a cable 29 which is adapted to pass beneath a roller or pulley 30 and upwardly about a pulley 58 mounted upon the standard 36 adapted to support the mast 33. The forward end of the cable is passed over a sheave 53 upon the boom 35.

The mast 33 referred to is mounted at its lower end within the standard 36 rotatively placed upon the platform 9. The lower end of the standard 36 is extended radially and formed with teeth 38 adapted to engage with the teeth upon a drive pinion 39 adjacent thereto.

The drive pinion 39 is mounted upon a short shaft 40 mounted within the platform 9 and having at its lower end a beveled gear 41 which meshes with a similar gear 42 upon a shaft 43. The said shaft 43 has operative connection with a similar gear upon an upright shaft 44 which has at its upper end a similar engagement through means of a gear 45 with a gear 46 upon the shaft 25. Thus, when the drive sprocket 27 is engaged by means of the clutch 47 with the shaft 25 the operative connection between this shaft and the pinion 39 will tend to transmit a rotative movement to the mast 33 in an obvious manner.

If it is desired to rotate the drum upon the shaft, the clutch 47 may be moved to form a driving engagement between the sprocket 27 and the reel 28, as previously set forth.

The standard 36 upon which the mast 33 is mounted is formed on the side normally presented toward the rear with spaced ears 48. These ears are formed with openings 49 to receive a pin 50 upon which is pivotally connected the lower end 51 of the boom 35. Said boom is tubular in construction, and an opening 52 is formed in the side of the standard 36 to allow the passage of a cable therethrough and longitudinally through the boom 35 so as to pass about sheaves or pulleys 53 mounted upon brackets 54 at the upper end of the boom.

Cables 55 and 56 from the reels 15 and 16 may be passed upwardly, one of them over guide rollers 57 and 58 and through the opening 52 and longitudinally of the boom to engage about one of the sheaves 53 for the operation of loads, which may be connected therewith. It is contemplated that one of these cables may be connected with a clam shell bucket or other similar conveying bucket, and the other cable 29 from the reel 28 may be connected with the tripping latch forming a part of said bucket. Thus, the operator will be able to operate either of the reels 15 or 28, as desired, so as to raise or lower the bucket or trip the same when desired through the operation of these cables.

The other of the cables 55 or 56 may be passed upwardly over the roller or pulley 30 and over a sheave 31 at the upper end of the mast 33 and be attached at its outer end to the eyelet 34 upon the sleeve 34′ at the upper end of the boom 35. Through means of this cable 56 the boom itself may be raised or lowered, as desired.

In the operation of this device, the tractor may be positioned at any desired point for operation and loads may be lifted or operative devices, such as the clam shell bucket, may be manipulated through the operation of the attachment, as previously described. The boom may be raised or lowered relative to the mast by the operation of the reel 16 through the cable 56 attached thereto. The boom and the mast may be rotated to swing the boom at any desired angle relative to the tractor by engaging the clutch 47 with the shaft 25 and through the driving connections between the same and the gear 38 upon the standard.

The cables 55 and 56 may be reeled up or unreeled while the tractor is at rest through the use of the clutches 19 at either side of the tractor.

The supporting legs 11 may be employed whenever heavy loads are being operated and where any further support for the mast and boom is necessary. The advantages of this construction will be obvious to those skilled in the art.

Having thus described our invention, what we claim as new is:

1. An attachment for tractors having a driven power shaft and a power take-off; an auxiliary rear axle, traction wheels thereon, a plurality of hoisting reels on said auxiliary axle, a driving connection between said power shaft and said auxiliary axle, control means therefor whereby rotation may be communicated selectively to said axle or to either of said reels, a mast supported by said auxiliary axle, a boom connected with said mast, sheaves on said boom, operating cables on said reels running over said sheaves, and means to control the position of said boom.

2. An attachment for tractors having a driven power shaft and a power take-off; an auxiliary rear axle, traction wheels thereon, a plurality of hoisting reels on said auxiliary axle, a driving connection between said power shaft and said auxiliary axle, control means therefor whereby rotation may be communicated selectively to said axle or to either of said reels, a mast supported by said auxiliary axle, a boom connected with said mast, sheaves on said boom, operating cables on said reels running over said shaves, and means operated from said power take-off to control the position of said boom.

3. An attachment for tractors having a driven power shaft and a power take-off; an auxiliary axle, traction wheels thereon, a plurality of hoisting reels on said auxiliary axle, operative connections between said power shaft and said auxiliary axle, clutches adapted to control the application of said connections to said axle, or to either of said reels, a platform supported above said auxiliary axle, a mast thereon, a boom on said mast, a driven shaft operated from said power take-off, a control reel thereon, cable connection between said control reel and said boom, and load operating means on said boom connected with said first mentioned reels.

4. A tractor having an auxiliary driven rear axle, and a power take-off, in combination with a pair of hoisting reels on said auxiliary rear axle, means to rotate said reels independently of said axle, a platform supported above said auxiliary axle, a mast thereon, a boom on said mast, a driven power shaft operated from said power take-off, a control reel thereon, cable connection between said control reel and said boom, and load operating means on said boom connected with said first mentioned reels.

5. A tractor having a power shaft, an auxiliary rear axle driven therefrom, a power take-off, a plurality of reels on said auxiliary rear axle, means to connect either of said reels operatively with said power shaft, a boom, a rotatable support therefor, sheaves on said boom, cables on said reel running over said sheaves, and means to control said boom.

6. A tractor having a power shaft, an auxiliary rear axle driven therefrom, a power take-off, a plurality of reels on said auxiliary rear axle, means to connect either of said reels operatively with said power shaft, a boom, a rotatable support therefor, sheaves on said boom, cables on said reel running over said sheaves, and means operated from said power take-off to control said boom.

7. A tractor having a power shaft, an auxiliary rear axle driven therefrom, a power take-off, a plurality of reels on said auxiliary rear axle, means to connect either of said reels operatively with said power shaft, a boom, a rotatable support therefor, sheaves on said boom, cables on said reel running over said sheaves, and means to control said boom, comprising a control shaft operated from said power take-off, a reel thereon, a cable on said reel connected with said boom, and additional means connected with said control shaft to rotate said boom support.

8. A tractor, a platform thereon, an upright mast rotatable on said platform, a tubular boom attached to said mast, an auxiliary rear axle, reels thereon, cables on said reels adapted to pass longitudinally of said boom, means to operate any of said reels from said tractor, and means independently of said reels to move said mast and boom.

In testimony whereof we hereunto affix our signatures this 20th day of October, A. D. 1927.

JAMES D. CUMMINGS.
ROBERT R. NORRIS.